United States Patent
Obritsch et al.

(10) Patent No.: US 6,432,302 B1
(45) Date of Patent: Aug. 13, 2002

(54) WATER CIRCULATION APPARATUS SYSTEM AND METHOD

(75) Inventors: Tait Joseph Obritsch, Fairfield; Willard Richard Tormaschy, Dickinson, both of ND (US); Wayne Everet Ruzicka, 1300 N. 3$^{rd}$ St., Bismarck, ND (US) 58501; Joel John Bleth; Gary Allen Kudrna, both of Dickinson, ND (US)

(73) Assignees: PSI-ETS, A ND Partnership, Dickinson; Wayne Everet Ruzicka, Bismarck, both of ND (US)

( * ) Notice: Subject to any disclaimer, the term of this patent is extended or adjusted under 35 U.S.C. 154(b) by 0 days.

(21) Appl. No.: 09/575,296

(22) Filed: May 19, 2000

Related U.S. Application Data

(63) Continuation-in-part of application No. 09/315,736, filed on May 20, 1999.

(51) Int. Cl.$^7$ .................................................. C02F 7/00
(52) U.S. Cl. ................. 210/170; 210/242.2; 417/423.9; 415/58.5; 415/58.7
(58) Field of Search ........................ 417/423.9; 210/170, 210/242.2, 242.1; 415/58.5, 58.6, 58.7

(56) References Cited

U.S. PATENT DOCUMENTS

| | | | |
|---|---|---|---|
| 3,204,768 A | 9/1965 | Daniel | 210/197 |
| 3,794,303 A | 2/1974 | Hirshon | 261/61 |
| 3,856,272 A | * 12/1974 | Ravitts | 259/95 |
| 4,030,859 A | 6/1977 | Henegar | 417/61 |
| 4,179,243 A | 12/1979 | Aide | 417/61 |
| 4,647,374 A | * 3/1987 | Ziaylek et al. | 210/242.1 |
| 4,657,675 A | 4/1987 | Zan | 210/170 |
| 4,906,359 A | 3/1990 | Cox, Jr. | 210/170 |

FOREIGN PATENT DOCUMENTS

| | | | |
|---|---|---|---|
| CA | 1262052 | 3/1989 | 61/18 |
| JP | 1147794 | 2/1999 | |

OTHER PUBLICATIONS

Aeromix Systems, Incorporated brochure on Hurricane Submersible Aerator EcoEssence, Incorporated, EcoEddy brochure, Sep. 1997.
Otterbine Barebo, Inc. brochure, Nov. 1997.
Accel–o–Fac brochure, 1997.
Environmental Equipment Engineering, Inc. brochure, 1989.

* cited by examiner

Primary Examiner—Ehud Gartenberg
(74) Attorney, Agent, or Firm—Curtis V. Harr

(57) ABSTRACT

This circulation device is equipped with a water impeller that is larger than and tightly fitted over the top of the draft tube through which the water from the pond or reservoir is drawn. The water drawn up and directed outwardly over a large diffuser plate that is centrally located within the invention. The outer edge of the diffuser plate is equipped with a laminar flow diffuser lip which is specifically designed to inhibit the passage of water from the diffuser plate to the open water as little as possible. Additionally, a means of providing a floating water circulation apparatus with the ability to operate effectively in weather conditions in which a layer of ice is likely to form over the diffusor plat of the apparatus in the nighttime hours is provided.

21 Claims, 11 Drawing Sheets

FIG 4
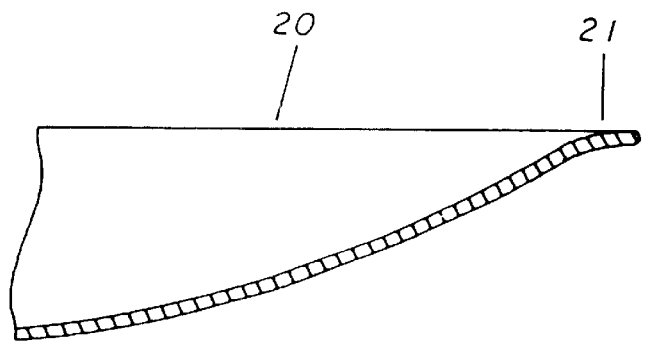
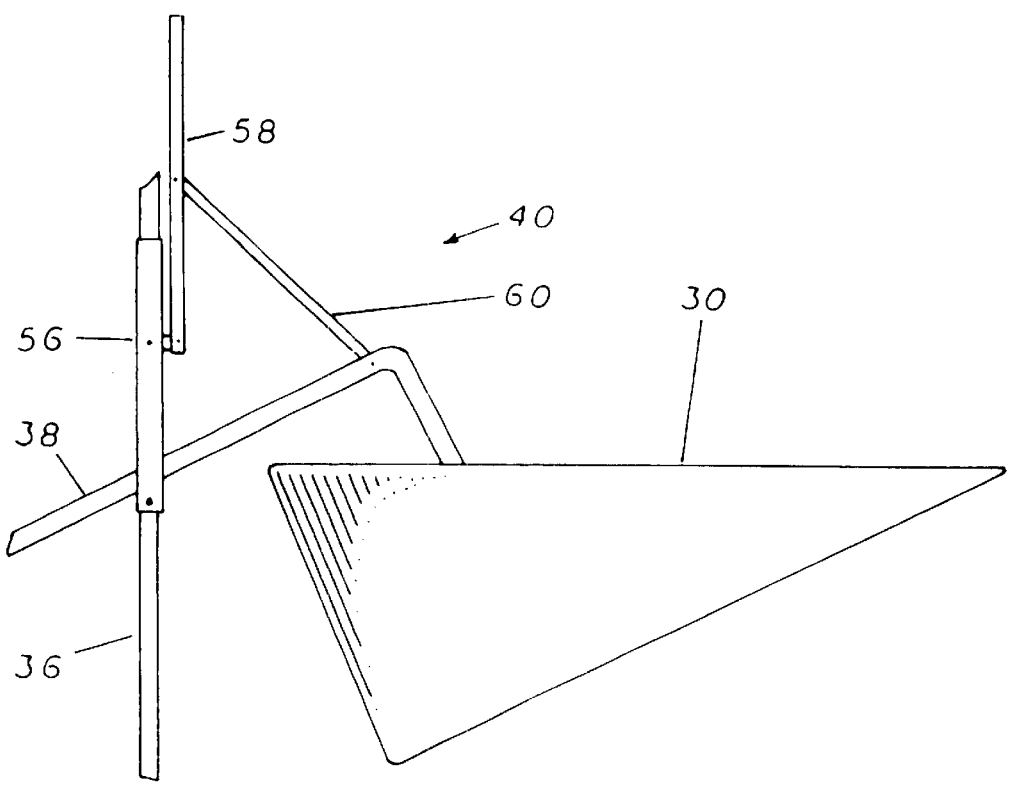
FIG 5

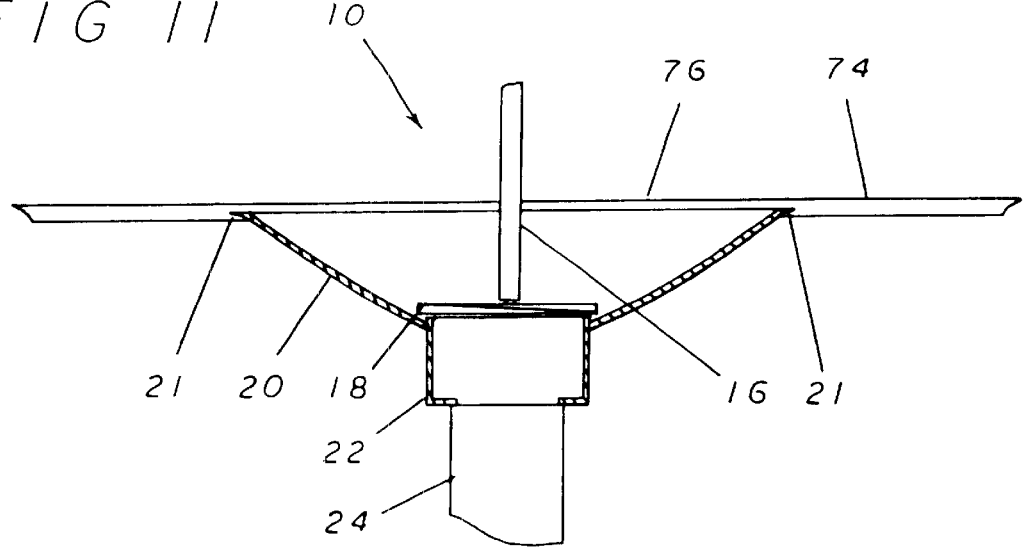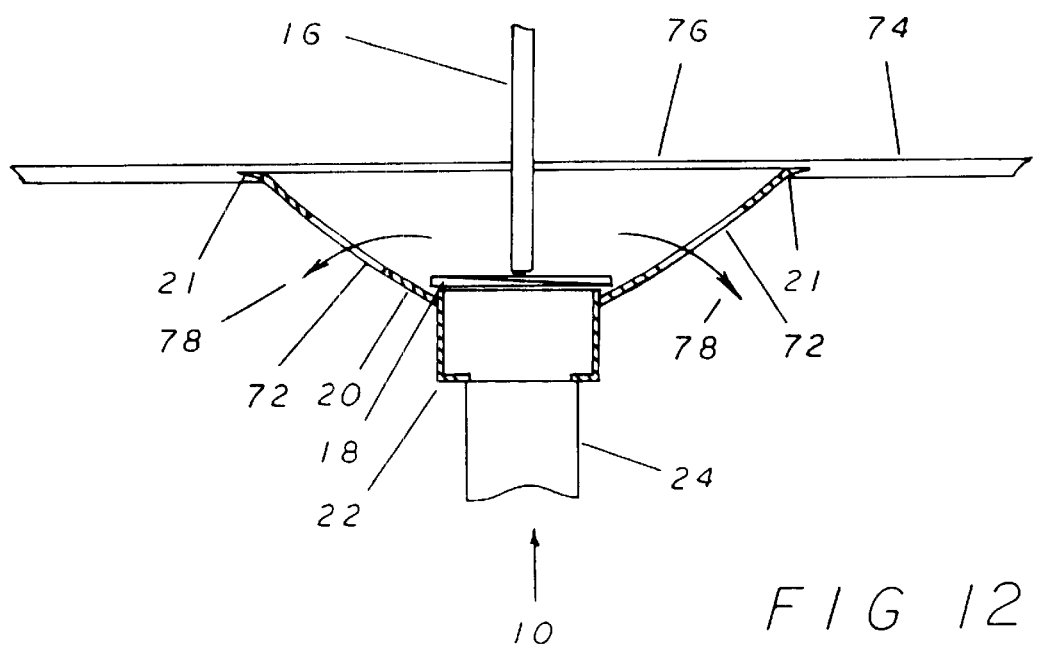

FIG 17
FIG 18
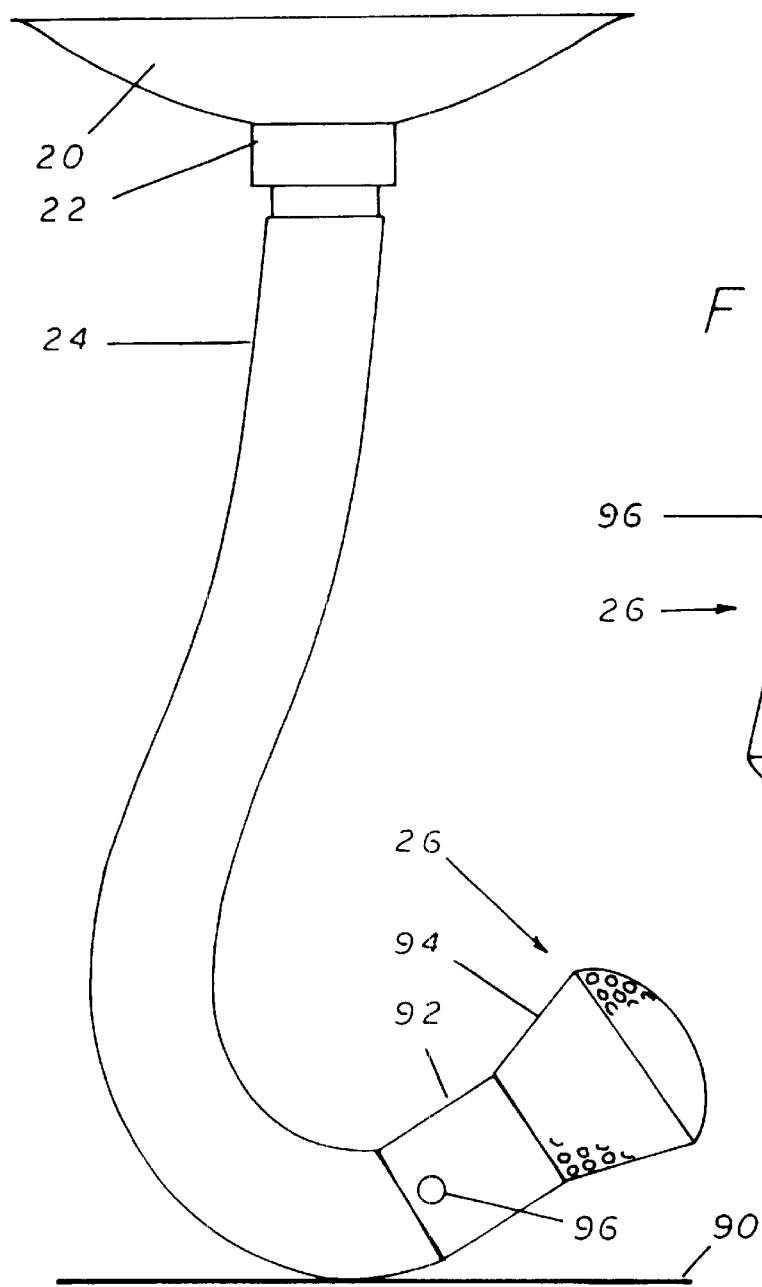
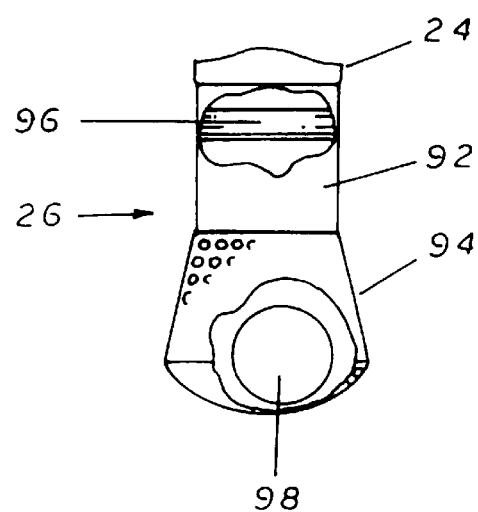

WATER CIRCULATION APPARATUS SYSTEM AND METHOD

This application is continuation-in-part of Ser. No. 09/315,736 filed May 20, 1999.

BACKGROUND OF THE INVENTION

The present invention relates to a circulation system for a body of liquid. More specifically, to a floating system for exchanging or displacing water or other liquids from lower levels and delivering them to the upper surface to allow for maximum exposure to the atmosphere.

In order for many bodies of water to develop and maintain a healthy eco-system, a non-specific amount of circulation is typically required. This is because many of the bacteria that are necessary for breaking down or digesting nutrients are immobile, and therefore, need to be placed in intimate contact with nutrients, necessary to thrive, by circulation of the water. Furthermore, in the majority of applications, bacteria also need oxygen to survive and flourish. The most readily available source of oxygen is from the atmosphere.

Oxygen can enter the water through contact with the atmosphere which may be accelerated through mixing, as happens in nature through waterfalls, streams, rain, and wind. It has been found that adding artificial aeration, to assist nature, to natural and man made ponds and lagoons can greatly increase the health of the ponds. This may be especially useful in sewage lagoons and the like as the decay process could be accelerated and unpleasant smells reduced.

In order to combine the movement of liquid and supplying of the oxygen, past prior art has typically used one of three methods: (1) a surface splashing action (2) an aspirator/boat prop effect which draws atmospheric air in and then forces air bubbles out or (3) compressing atmospheric air and then releasing it at the bottom of the body of liquid. In each of these actions two things are readily apparent (A) high energy input with corresponding high maintenance needs and (B) the action created is always turbulent.

The use of pond aerators on floating bases has been well establishe such as those shown by U.S. Pat. No. 4,179,243 granted to Aide and U.S. Pat. No. 4,030,859 granted to Henager. In these patents, devices are typically supplied with a draft tube placed just below the surface of the water. This tube houses a propeller or impeller that is connected to a drive means. A draft line is placed at a predetermined depth and connected to the draft tube. Thus, as the drive means turns, the impeller or propeller draws water from a certain depth and defuses it at the water surface. This process circulates and turns the water in the pond. As power to the pump can be a significant issue in remote areas, such as the middle of a pond or lake, the efficiency of the whole unit is crucial to its success. This has required that alternative means of driving the pump on pond mixers would be desirable. One solution has been to use wind power, however wind powered pumps are large in size, expensive, cumbersome, and create a need for complex and expensive anchoring systems.

From this discussion it can be seen that a low energy, circulation method is needed. Such a method or device should be designed to gently circulate (vs. turbulent mixing) a liquid from bottom-to-top with a minimum amount of energy and deliver that liquid to a major oxygen source (the atmosphere) in a manner which will maximize atmospheric absorption. Further it would be advantageous to make such a system so that it can be driven by an inexpensive renewable resource, and thus, able to be used in remote areas with a minimal amount of setup.

SUMMARY OF THE INVENTION

It is the primary objective of the present invention to provide a method of circulating bodies of water in a highly efficient manner that allows for the use of an extremely low horsepower pump.

It is an additional objective of the present invention to provide a method of circulating bodies of water and thus, increase their exposure to the atmosphere through the use of an alternative source of power, such as relatively small solar panels.

It is an additional objective of the present invention to combine these characteristics in a small, floating, portable device that can be placed in a desired location and left to circulate a liquid from a lower elevation to the surface.

It is an additional objective of the present invention to provide a method of delivering liquid, through a distribution dish or diffusor, in a non-turbulent manner that will maximize the amount of time the liquid remains on the surface.

It is an additional objective of the present invention to provide a means by which a water circulation apparatus can be used to constantly circulate a body of water during times where the surface of the body of water is prone to freezing during the nighttime hours which, with current water circulation apparatuses, tends to block the distribution of water from the diffusor of the apparatus to the surface of the body of water which in turn blocks circulation.

It is a further objective of the present invention to provide a such a method of anchoring such devices that will allow a water circulating device to ride up and down on the water's surface waves while being-subjected to continuously alternating cycles of tug and slack in high wind conditions without interfering with its floatation characteristics or its ability to move under normal weather conditions.

It is a still further objective of the present invention to provide such a water circulation apparatus which has a water pick up system that is designed in such a way so that the water pick up tube will not get tangled with the anchor line while the circulation apparatus is drifting around the surface of a body of water.

These objectives are accomplished by the use of a floating circulation apparatus that has as an on-board power system. This on-board power system may consist of a plurality of solar panels that produce the entirety of the power required to drive the water pump, however other power such as wind, electrical, gas or others may be used. This circulation device is equipped with a water impeller that is larger than, and tightly fitted over, the top of the draft tube through which the water from the pond or reservoir is drawn. By placing the impeller above and out of the draft tube, the efficiency of the pump will be greatly increased. Thus, the same amount of horsepower will move a much larger amount of liquid.

By having the impeller up and out of the draft tube, it is also possible to impart movement to the water in two different ways. First, the impeller moves water by a lifting action which is caused by the rotation of the auger-like impeller. Second, the impeller imparts a rotating motion to the water. This rotating motion will generate centrifugal force, causing even more water movement or mixing. Prior art circulation devices place the impeller down in the draft tube and thus, the rotating motion of the water is wasted as the water is trapped by the walls of the draft tube.

The present invention is also equipped with a large flow distribution or diffuser dish surrounding the impeller. The size and shape of the impeller works to allow the water to move directly away from the impeller, radially. Additionally, the flow diffuser is also equipped with a specially designed outer edge which does not impede the radial flow of water created by the impeller as it passes from the diffuser to the surface of the lake or pond. This allows the present invention to circulate a body of water more effectively, as the motion imparted to the water by the impeller is more efficiently passed outside of the diffuser. Thus, the centrifugal force phenomenon is utilized to create water movement at the surface which in turn operates to circulate the body of water.

The present invention is also equipped with freeze slots that work in conjunction with the flow diffusor of the water circulation apparatus in situations in which the flow of water from the diffusor to the body of water is interrupted or completely blocked by the formation of ice which is a common occurrence in fall and winter mornings. The slots alleviate this blockage problem and are a plurality of relatively long and narrow slots within the surface of the diffusor. These slots provide an avenue for water to pass from the interior of the diffusor to the body of water on the outside of the diffusor. Thus, when the normal flow of water has been blocked by the formation of ice, the slots allow the water inside of the diffusor to pass out to the body of water which in turn provides the desired circulation to the water despite the ice.

Additionally, the plurality of slots of the present invention do not interfere with the normal operation of the water circulation apparatus in normal, non-ice, weather conditions. This is true due to the fact that in normal operating conditions the water pressure inside of the diffusor is essentially the same as that outside and so the water will take the path of least resistance which is over the diffusor lip. Conversely, when there is ice blocking this normal route of passage, the rotation of the impeller creates water pressure within the diffusor which serves to force the water out of the slots and into the body of a water which effectively keeps the circulation of the body of water in progress despite the formation of ice.

The present invention also employs an anchoring apparatus that is made up of a pair of weighted blocks which are connected in line by means of an anchor line to either the frame of the circulation apparatus or to one of its plurality of floats. Each of the weighted blocks is most commonly made of a concrete or concrete-like material that is of the correct density that will allow the blocks to be used as an anchor at a size that is practical to handle. Additionally, the form of the concrete blocks in no way pose any threat to the integrity of the non-permeable pond liners as it contains no sharp points or edges that can puncture or tear the liner of some ponds.

The anchoring device for the a water circulation apparatus operates in normal weather conditions by simply sitting on the bottom of a typical pond or lagoon. In these conditions, there is no undue stress place on the line or the blocks and the most forward of the two blocks and the length of the anchor line between it and the circulation apparatus will control the position of the apparatus on the surface of the water. The problem in anchoring these types of devices is a result of less than perfect weather conditions when the wind is blowing hard and is creating waves on the surface of the water. The wave motions in these conditions operate on the circulation apparatus by constantly placing alternating tug and slack forces on the anchor. This can create a serious situation as these types of forces tend to draw the anchor across the bottom of the pond which allows the circulation apparatus to wander randomly around the surface of the pond.

The use of two anchor blocks in the present invention counteracts this potential problem and keeps the circulation apparatus within its desired range of motion. This occurs because as the wind speed increases and begins to move the apparatus away from the anchor, the forward anchor is pulled forward and upward on one of its edges by the anchor line. Once this has occurred, the intermediate anchor line is drawn tight and any remaining tug force is placed on the rear anchor. The weight of the front and rear anchors together along with the frictional resistance created by the rear anchor's flat position on the liner provide more than enough anchoring force to keep the circulation apparatus in the desired location. Conversely, when the tug force is released by the passage of the wave, the front anchor will return to its normal position on the liner and this action serves to absorb the slack created in the anchor line in windy weather.

Finally, the present invention is also equipped with a water pick up system that consists of a draft hose that is weighted towards its bottom end. This weight serves to keep the draft hose, and therefore the intake strainer head located at its terminus, on the bottom of the body of water directly below the center of the apparatus. As the anchor device for the present invention is attached through the anchor line on the outside edge of the body of the invention with the line extending outward therefrom, the anchor line can never come into contact with the centrally located draft hose. This design of the anchor and water pick up systems eliminate the possibility of encountering problems due to entanglement of the anchor line and the draft hose.

For a better understanding of the present invention reference should be made to the drawings and the description in which there are illustrated and described preferred embodiments of the present invention.

DESCRIPTION OF THE DRAWINGS

FIG. 4 is a side elevation, cut-away view of the diffuser lip component of the present invention showing the manner in which it is constructed, so as to not interfere with the flow of water as it passes outside of the diffuser.

FIG. 5 is a side elevation view of the pivoting float component of the present invention illustrating its orientation as it fully supports the weight of the invention while it is in the water.

FIG. 11 is a side elevation cut-away view of a typical flow diffusor from which the flow of water has been blocked by the formation of ice.

FIG. 12 is a side elevation cut-away view of a flow diffusor that is equipped with freeze slots which allow for the passage of water from its interior to the body of water despite the formation of ice.

FIG. 17 is a side elevation view of the draft hose component of the present invention illustrating the orientation of the strainer head when on the bottom of the body of water in relation to the remainder of the draft hose.

FIG. 18 is a side elevation cut-away view of the strainer head portion of the draft hose illustrating the location of the strainer's internal components.

DESCRIPTION OF THE PREFERRED EMBODIMENT

Figure 1:
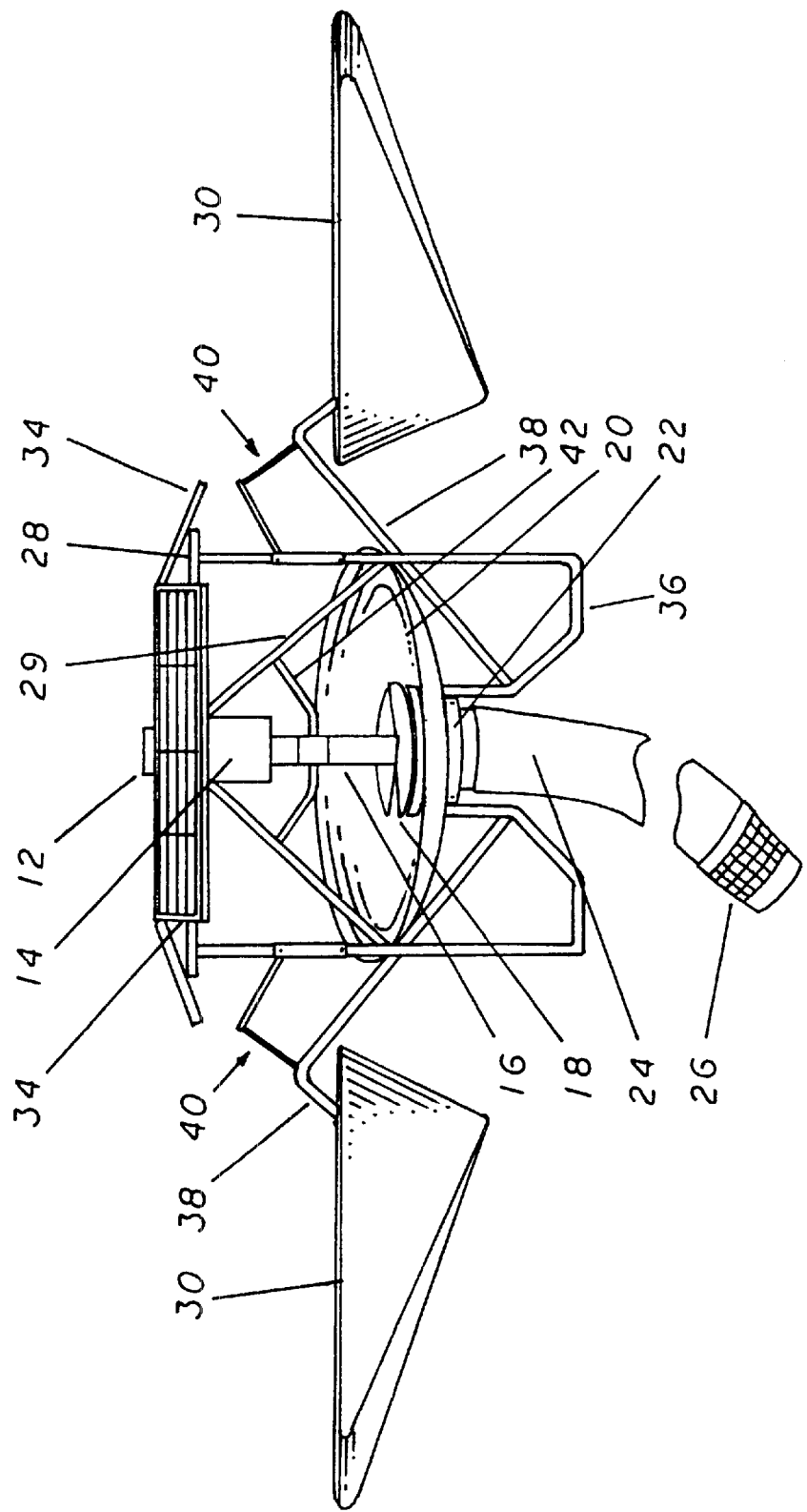
FIG. 1 is a perspective view of the present invention showing the orientation of its major components and the location of the water impeller and the water diffuser in relation to the body of the invention.
Figure 2:
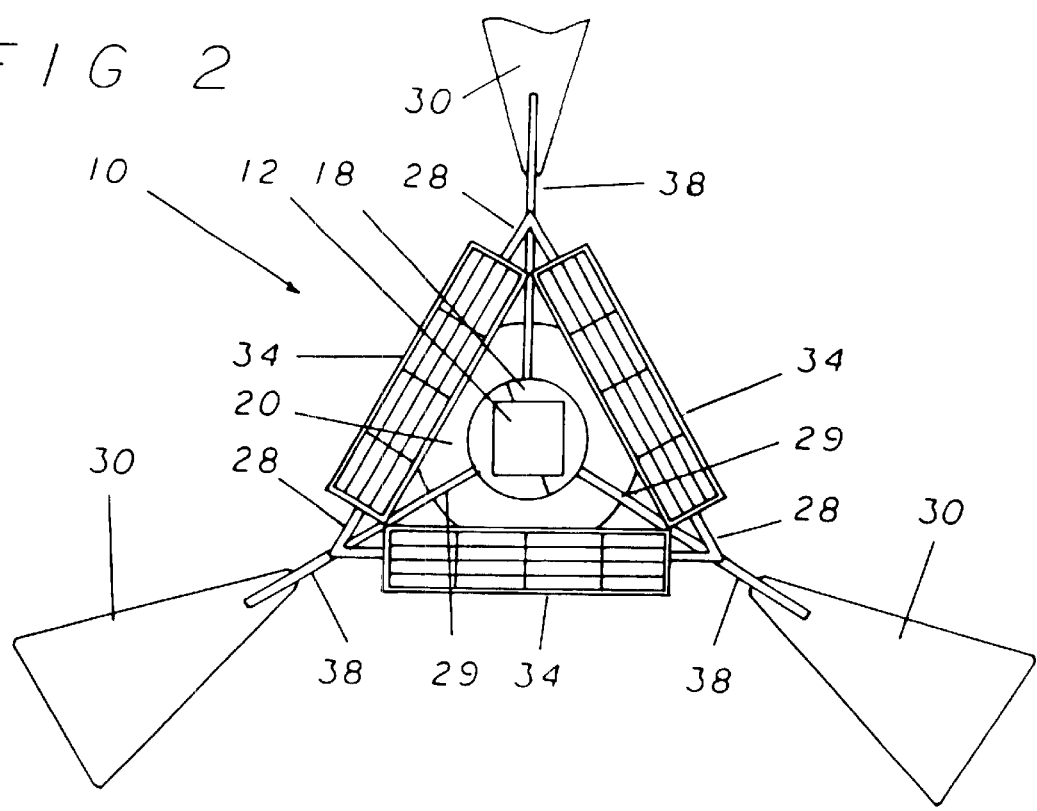
FIG. 2 is a top elevation view of the present invention showing the orientation of the impeller and the diffuser to the solar panels and the floats.

Referring now to the drawings, and more specifically to FIGS. 1 and 2, the floating water circulation apparatus 10 is made up of a triangular frame member 28 which provides the structure to which the other components of the present invention are attached. The triangular frame member 28 has extending in an outwardly manner from each point of the triangle the pivoting float arms 38 which in turn provide the attachment point for the plurality floats 30. These floats 30 are positioned at the outer edge of the triangular frame member 28 which provides a greater degree of stability for the present invention when placed in a body of water and also serves as lever arms to counteract any rotational forces applied to the present invention. The outward location of the floats 30 also serves to keep them from interfering with the flow of the circulated water. The floats 30 are pivotally attached to the lower surface of the pivoting float arms 38 and serve to hold the triangular frame member 28 of the present invention in a horizontal position above the surface of the body of water to be circulated.

The triangular frame member 28 provides for the mounting of the primary components of the present invention at its center. This is accomplished by having a plurality of inner support bars 29 extending inward from the triangular frame member 28 and attaching to the exterior of the impeller shaft housing body 16. This attachment (which will be discussed in further detail below) serves to vertically suspend the impeller shaft housing body 16, and all other components attached to it, within the central portion of the triangular frame member 28. The result of this configuration is that the triangular frame member 28 and the floats 30 work in conjunction to hold the primary components of the present invention in the proper position relative to the body of water.

The primary components of the present invention are all attached to the triangular frame member 28 through the impeller shaft housing body 16. The end of the electric drive motor 12, which supplies the rotational force necessary to pump water, is mounted to the upper most end of the impeller shaft housing body 16. The electric drive motor 12 is equipped with a gear reduction system that allows the electric drive motor 12 to spin at a high RPM, but reduces to a substantially lower RPM at the impeller 18. This allows the use of a relatively low voltage electric drive motor 12 as the lower RPM of the gear reduction system provides sufficient torque at the impeller to rotate it even at slow speeds.

Directly below the electric drive motor 12 on the impeller shaft housing body 16 is the electronic control box 14 which is made up of a sealed box or "potted" to ensure that the electrical components contained within will operate in wet conditions and will continue to control the flow of water through the impeller 18. The electronic control box 14 contains a linear current booster which takes the supplied voltage and amperage and varies their values to match the requirements of the electric drive motor 12. The most common example of this is that the electronic control box 14 will convert excess voltage to amperage, which allows the electric drive motor 12 to run for a longer period of time or at a higher speed on cloudy or hazy days.

The power necessary to run the present invention is supplied by a plurality of solar panels 34 which are mounted along each edge of the triangular frame member 28. The solar panels 34 are each mounted above the upper surface of the triangular frame member 28 at a slight downwardly facing angle of approximately 20 degrees which aids in keeping the face of the solar panels 34 free from debris and rain or heavy dew will have the effect of washing the surfaces clean. Additionally, the triangular orientation of the solar panels 34 ensures that the equivalent of two full panels are always producing power regardless of the present invention's position on the water with respect to the location of the sun. In one embodiment of the present invention, each of the solar panels 34 produces 55 watts of electric power and the electric drive motor 12 requires 110 watts to operate at its maximum capacity. The positioning of the solar panels 34 on the triangular frame member 28 ensures that the electric drive motor 12 will always have enough power to operate in an efficient 20 manner. It must be stated at this point that other sizes of solar panels 34 and electric motor 12 may be used to optimize the current invention for any given size pond.

The triangular frame member 28 of the present invention is also equipped with support legs 36 which extend downward into the body of water. These support legs are also individually attached to the outer most edge of the flow diffuser 20 which helps to secure the flow diffuser 20 in the proper orientation, within the body of the invention. Additionally, the support legs 36 also provide a means of support for the present invention in the event that the body of water is emptied or dries up or for storage purposes.

The impeller shaft housing body 16 extends downward from its point of attachment with the inner support bars 29 to a point just above the water impeller 18. The water impeller 18 is located directly above the upper opening of the draft tube 22. It is important to note that the opening of the draft tube 22 is slightly smaller in diameter than the outside diameter of the water impeller 18. This configuration serves to create a more efficient pump as the larger diameter impeller 18 creates a partial seal over the smaller draft tube 22 opening which does not allow water to recirculate back down into the draft tube 22. This configuration results in a more efficient pumping action. The draft tube 22 is then connected at its lower most end to the draft hose 24 which extends down into the body of water to the desired depth. The lowest end of the draft hose 24 is equipped with a debris strainer 26 which ensures that no unwanted debris will enter and clog the present invention.

As the impeller 18 is rotated by the electric drive motor 12 it draws up water from the bottom of the body of water through the draft hose 24 and draft tube 22. Once the water passes through the water impeller 18 it enters the large bowl shaped flow diffuser 20 which is attached to the upper edge of the draft tube 22 and extends upward and outward therefrom. The flow diffuser captures the water as it leaves the draft tube 22 and gently directs the water, so as not to decrease overall efficiency, directly on to the surface of the water. The result of this is that an outward motion is created on the surface, which then causes induced flow, causing the entire body of water to go into motion.

Figure 3:
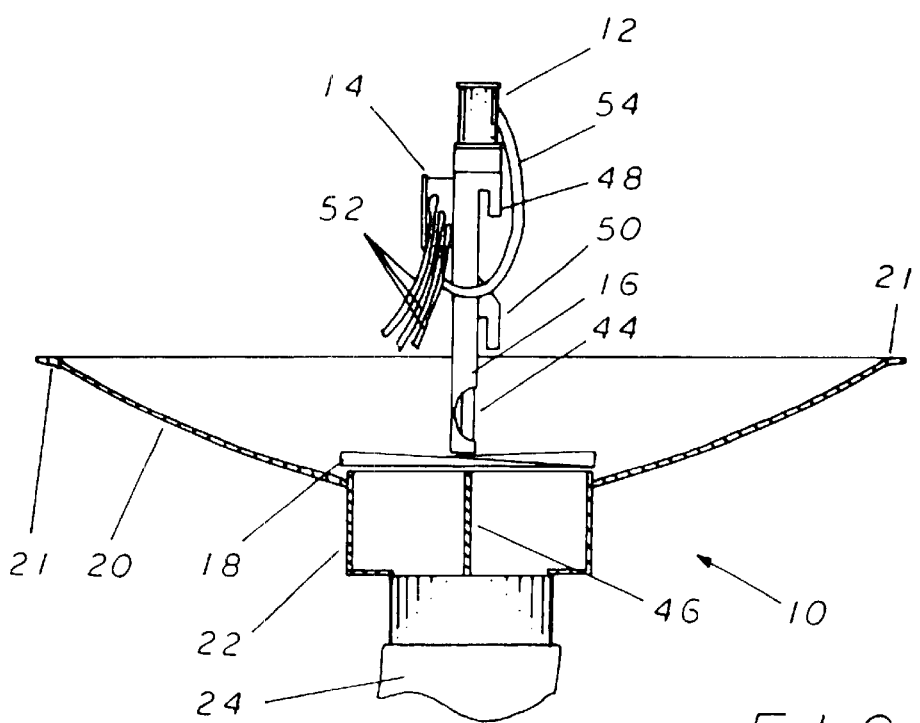
FIG. 3 is a side elevation cut-away view of the internal structure of the present invention showing the manner of construction of the impeller drive freeze sleeve and the draft tube and water flow divider.

Conversely, the rotating motion below the impeller 18 tends to diminish the efficiency of the pumping action. The present invention employs a device to counteract this effect which is illustrated in FIG. 3. The draft tube 22 is equipped with a flow diverter vane 46 which dissects its interior into two equal parts. The flow diverter vane 46 limits the circular flow of water within the draft tube 22 and by this, increases the efficiency of the water impeller 18 as it rotates just above the flow diverter vane 46 with very little clearance between the two. This ensures that most of the energy used to generate motion in the water within the flow diffuser 20 is transferred through the water over the surface of the water being circulated.

Figure 7:
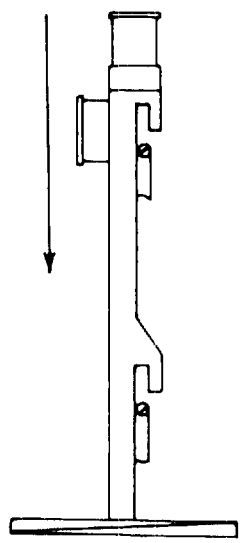
FIG. 7 is a side elevation view of the impeller shaft housing body component of the present invention illustrating the manner in which it is designed that allows it to be quickly and easily removed from and installed on the frame members of the invention.

The construction of the impeller shaft housing body 16 (along with other features of the present invention) is also illustrated in FIG. 3 which shows the location of the impeller drive shaft 44 within the impeller shaft housing body 16. The water impeller 18 is connected directly to the impeller drive shaft 44, not to the impeller shaft housing body 16, and is suspended in a cantilever manner by the impeller drive shaft 44. The connection of the impeller shaft housing body 16 to the triangular frame member 28 of the present invention (which is further detailed in FIG. 7) is accomplished by the use of the upper shaft attachment hook 48 and the lower shaft attachment hook 50 both of which are protrusions from the side of the body of the impeller shaft housing body 16 which have downwardly oriented slot-like openings. It is into these openings that the inner support bars 29, which fit inside of the slot of the upper shaft attachment hook 48, and the lower shaft attachment bars 42, which fit into the slot of the lower shaft attachment hook 50, slip into to hold the entire central assembly of the present invention in place.

On the other hand, to remove the impeller shaft housing body 16 (and therefore the impeller 18, the electric motor 12, and the electronic control box 14) one simply lifts up on the impeller shaft housing body 16 until the slots of the upper and lower shaft attachment hooks, 48 and 50, are clear of the inner support bars 29 and the lower shaft attachment arms 42 respectively. This system of attachment for the impeller shaft housing body 16 and all of the components of the invention that are attached to it, allow for easy removal from the body of the invention for service or replacement.

The electronic control box 14, which is mounted to the upper side of the impeller shaft housing body 16, serves to contain all of the electronic controls for the present invention. In this capacity, there are a plurality of control wires that run to and from the electronic control box 14. The first of these are the plurality of panel to control box feed lines 52 which connect the solar panels 34 to the electronic control box 14 and transmit the energy generated in the solar panels 34 to the electronic control box 14. This energy is then processed by the electronic control box 14 and sent to the electric drive motor 12 by use of the box to motor feed wire 54. Thus, the electric drive motor 12 uses energy created by the solar panels 34 to drive the impeller 18, causing the body of water to be circulated.

Figure 8:
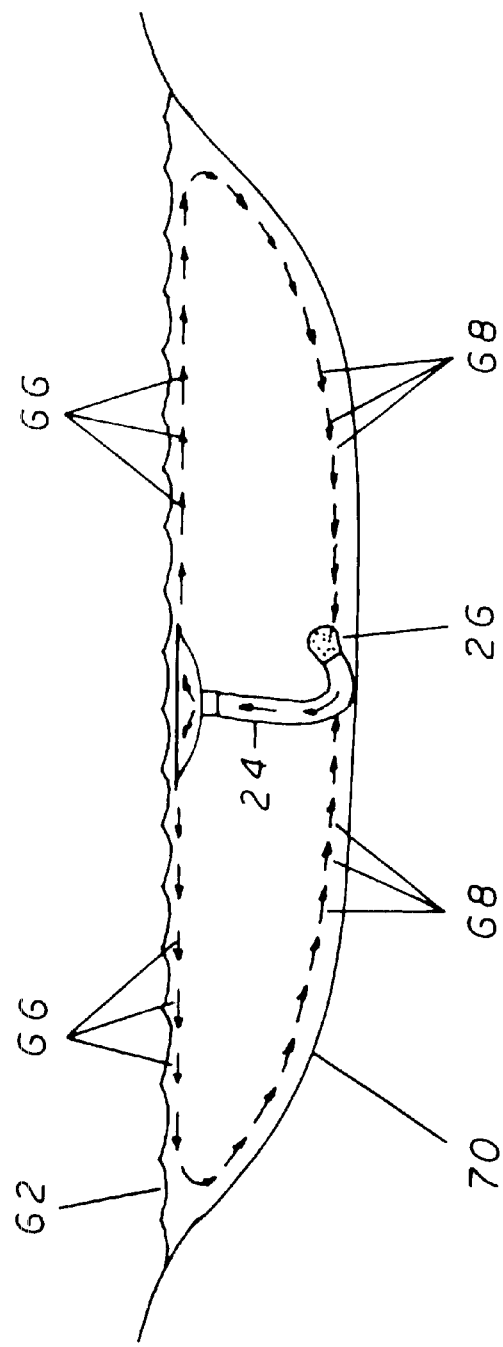
FIG. 8 is a side elevation view of the present invention diagraming the manner in which the water flows in a laminar fashion both from the flow diffuser on the surface of the water and to the draft tube below the surface of the water.

The primary function of the present invention, to circulate the water contained in lakes or ponds, is best illustrated in FIG. 8. As the impeller 18 of the invention rotates, it drives the process which circulates water throughout the body of the pond 70, that eventually allows the water to become oxygenated naturally. This ensures that the body of water will remain in a healthy state by keeping the levels of algae in the proper ratio to the size of the pond 70.

Figure 9:
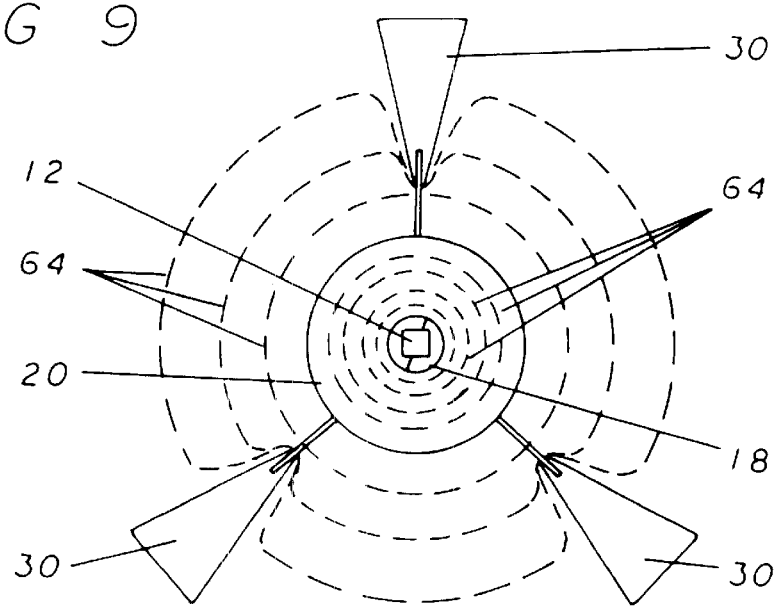
FIG. 9 is a top elevation view of the present invention diagraming the manner in which the water leaves the flow diffuser in concentric circles of laminar flowing water.

The process of oxygenating the water occurs as a result of a plurality of events occurring at the same time. The first of these is that the rotation of the impeller 18 forces water out of the flow diffuser 20 over the laminar flow diffuser lip 21 creating the surface laminar flow 66. The surface laminar flow 66 is a very thin layer of water flowing on the surface at a very low velocity. Additionally, the surface laminar flow 66 occurs in a radial manner from the invention (an occurrence that is best illustrated in the diagram in FIG. 9) which ensures that it will eventually extend to all portions of the surface of the pond 70.

While the surface laminar flow 66 is being forced out of the present invention at the surface of the pond 70, an additional layer of water is being drawn into the draft hose 24 through the strainer 26 below the surface of the pond 70. This layer of water, which acts in much the same manner as the surface laminar flow 66, is called the under water laminar flow 68 and it is the water that is drawn up the draft hose 24 to be re-circulated by the impeller 18. The under water laminar flow 68 is a very thin layer of water that is flowing at a very low velocity. Finally, as the draft hose 24 draws this layer of water equally from all portions of the pond 70, the water is moving towards the draft hose 24 in a radial manner, which ensures that all the water in the pond 70 is involved in the circulation process.

The action of the surface laminar flow 66 and the under water laminar flow 68 creates an induced flow in the rest of the water contained in the pond 70. The induced flow means that as water molecules that are contained within the surface and under water laminar flows, 66 and 68, move away from or towards the present invention, they are replaced by other water molecules contained in the body of the pond 70. This action causes all of the water to eventually be drawn into the circulating action driven by the impeller 18 of the invention. The result of this is that over time, all of the water in the pond 70 will reach the surface where it will come into contact with the atmosphere. Once the water contacts the atmosphere, it will absorb oxygen naturally, thus, oxygenating the entire pond 70.

Figure 10:
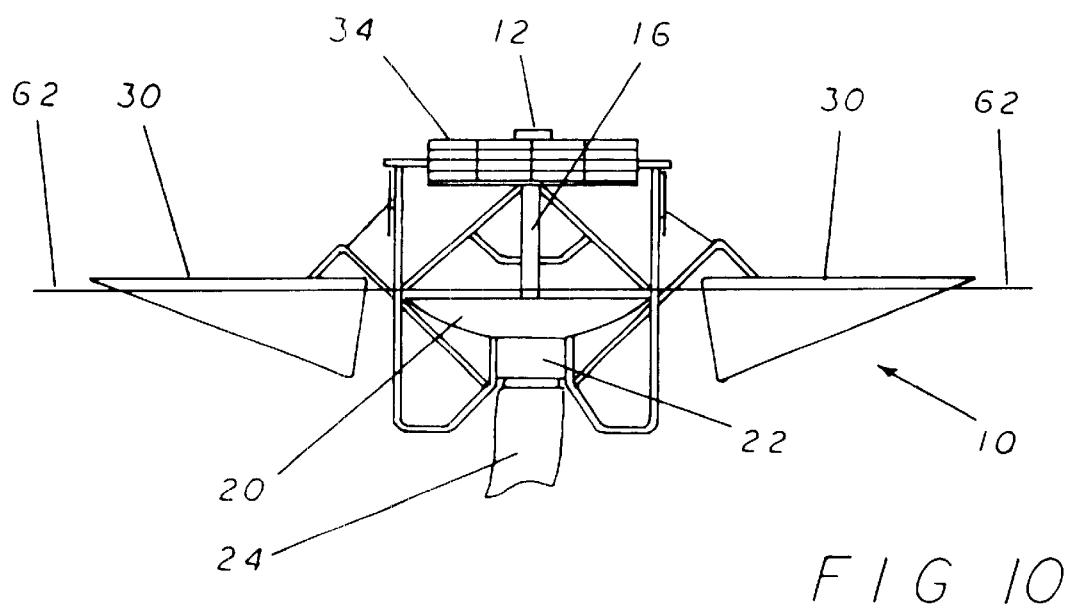
FIG. 10 is a side elevation view of the present invention illustrating the positioning of the flow diffuser just below the surface of the water when the invention is in use.

The water dispersion and circulation function of the present invention is also enhanced by the use of the laminar flow diffuser lip 21 which forms the outermost edge of the flow diffuser 20 and which is further detailed in FIG. 4. The laminar flow diffuser lip 21 functions to lessen the difference between the water within the flow diffuser 20 and the water outside of it. This is accomplished by constructing a lip that is different than the body of the flow diffuser 20. Additionally, the body of the flow diffuser 20 sits below the water line 62 when the present invention is placed in a lake or pond 70 which is illustrated in FIG. 10. This relative position of the flow diffuser 20 in relation to the water line 62 further enhances the function of the laminar flow diffuser lip 21 as it allows waves of water moving outward from the impeller 18 to pass freely between the laminar flow diffuser lip 21 and the water line 62.

Therefore, as water passes from the interior of the flow diffuser 20 to open water, the laminar flow diffuser lip 21 interacts with it as little as possible so that the motion imparted upon the water by the impeller 18 is not disrupted by the passing from the body of the diffuser 20 to the open water, which allows the present invention to operate at maximum efficiency. This function of the laminar flow diffuser lip 21 is further illustrated in FIG. 9 which clearly shows how the concentric waves 64 created by the rotation of the impeller 18 pass freely from the body of the flow diffuser 20 to the open water of the lake or pond. These features of the present invention ensure that the maximum amount of water possible is circulated by the rotation of the impeller 18.

Figure 6:
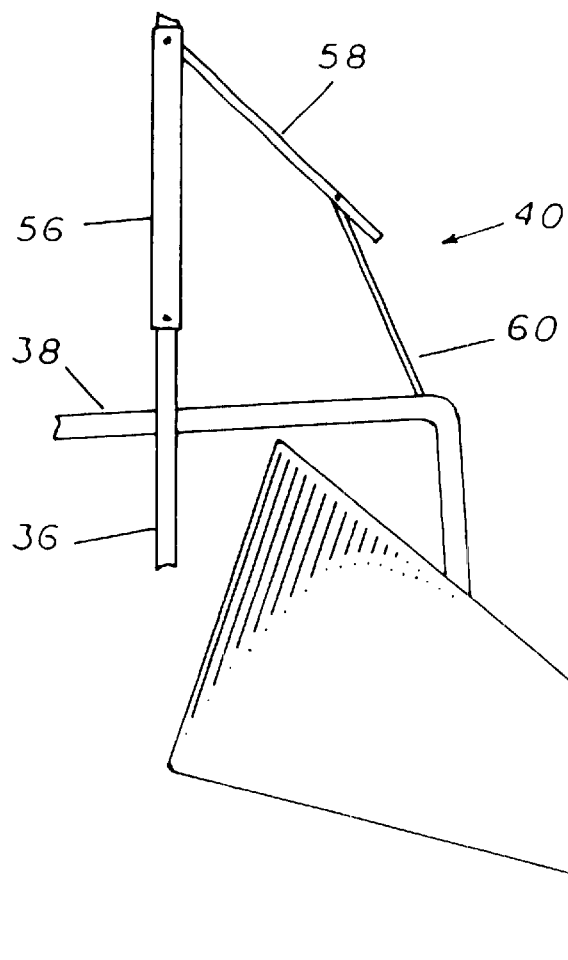
FIG. 6 is a side elevation view of the pivoting float component of the present invention illustrating its orientation when the body of the invention is out of the water and the floats are not used to support its weight.

The floats 30 and float support apparatuses of the present invention are constructed in a manner that allows the floats 30 to pivot in regards to the central body of the invention and this mechanism is illustrated in FIGS. 5 and 6. The float 30 itself is pivotally attached at its most inward end (in relation to the body of the invention) to the most outward end of the pivoting float arm 38 which is in turn pivotally attached at its most inward end to the inner sections of the support legs 36 of the invention. Additionally, at the point of attachment of the floats 30 to the pivoting float arms 38, the pivoting float arms 38 are formed into a downwardly oriented ninety degree bend. The purpose of this bend is that it allows the float 30 to pivot freely without any interference from the body of the pivoting float arm 38.

The floats 30 and the pivoting float arms 38 are also equipped with a pivoting float arm support 40 which helps to keep the floats 30 in the proper position in relation to the body of the invention. The pivoting float arm supports 40 are made up of three components and span the distance between the outer portion of the support legs 36 and the most outward end of the pivoting float arm 38. The portion of the pivoting float arms 38 that are attached to the support legs 36 are called the float arm support attachment bars 56, they extend along a portion of the outer edge of the support legs 36 above the level that the floats 30 rest when they are in their upward position. The uppermost end of these float arm support attachment bars 56 have pivotally attached to them the upper pivoting float support bars 58 which extend outward from this point of attachment. Finally, the upper pivoting float support bars 58 have pivotally attached to them towards their outer ends the lower pivoting float support bars 60 which extend downward to the point where they are pivotally attached to the upper edge of the pivoting float arm 38.

The function of the pivoting float arm support 40 is best shown in the differences between the illustrations in FIG. 5 and FIG. 6. In FIG. 5 the floats 30 are in an upward position which most commonly occurs when the present invention is in the water and the floats 30 are supporting its entire weight. Conversely, when the invention is out of the water for storage the floats 30 drop down as illustrated in FIG. 6. The pivoting float arm supports 40 help to guide the pivoting float arm 38 through this pivoting motion and ensure that the floats 30 remain in the correct orientation in relation to the body of the invention.

The manner in which a layer of ice 74 interacts with a floating water circulation apparatus 10 and how the freeze flow slots 72 of the present invention function to allow for the continued circulation of water in these circumstances are illustrated in FIGS. 11 and 12. In FIG. 11 a layer of ice 74 has formed over the diffusor 20 of the circulation apparatus 10 which has formed an ice dam 76 and has entirely closed off the interior of the diffusor 20 at the diffusor lip 21 from the open pond. This condition traps the water within the diffusor 20 which effectively renders the water circulation apparatus as ineffective as the water being drawn up through draft tube and hose, 22 and 24, and driven by the impeller 18 cannot pass into and circulate through the pond.

Conversely, the diffusor 20 illustrated in FIG. 12 has been equipped with a plurality of freeze flow slots 72 which allow for a path from the interior of the diffusor 20 to the exterior. Thus, when there is an ice dam 76 formed over the diffusor 20 due to cold weather, the freeze slots 72 allow water to flow (the direction of this flow is indicated through the use of the arrows marked as number 78) from the diffusor 20 to the rest of the water in the pond. This direction of flow 78 is ensured because as the impeller 18 rotates in what is effectively a closed off space, pressure builds within the diffusor which forces the water out through the freeze slots 72. Moreover, the presence of the slots 72 does not impair the effectiveness of the water circulation apparatus 10 in normal weather conditions as there is no build up of pressure within the diffusor so the water simply takes the path of the least resistance which is over the diffusor lip 21 and into the pond.

Figure 13:
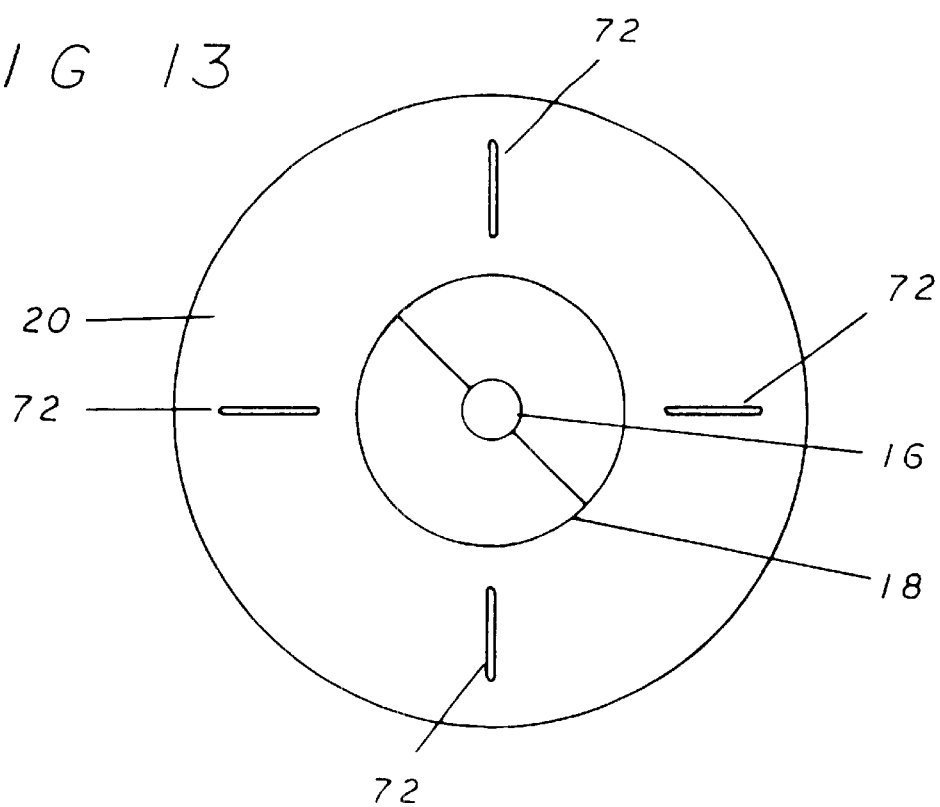
FIG. 13 is a top elevation view of a flow diffusor that is equipped with the present invention illustrating one possible orientation of the plurality of slots with the surface of the diffusor.
Figure 14:
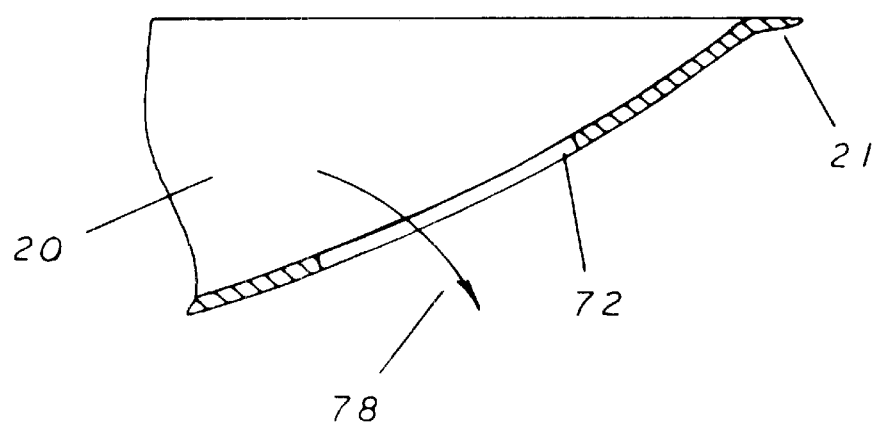
FIG. 14 is a side elevation cut-away view of a flow diffusor that is equipped with the present invention illustrating an individual slot's orientation in the diffusor and the manner in which it is formed in the body of the diffusor.

The orientation of the freeze flow slots 72 within the diffusor 20 and their manner of construction are further illustrated in FIGS. 13 and 14. As shown, the plurality of freeze slots 72 can be positioned radially in the body of the diffusor 20 around the centrally positioned impeller 18. The freeze slots 72 pass entirely through the body of the diffusor 20 which allows for free water flow 78 from the interior of the diffusor 20 to its exterior. Additionally, it is important to note that this particular arrangement of the freeze slots 72 within the diffusor 20 is only one of many possible variations in size, location, and orientation all of which may work equally as well as the other and the one shown here is simply depicted for illustrative purposes.

Figure 15:
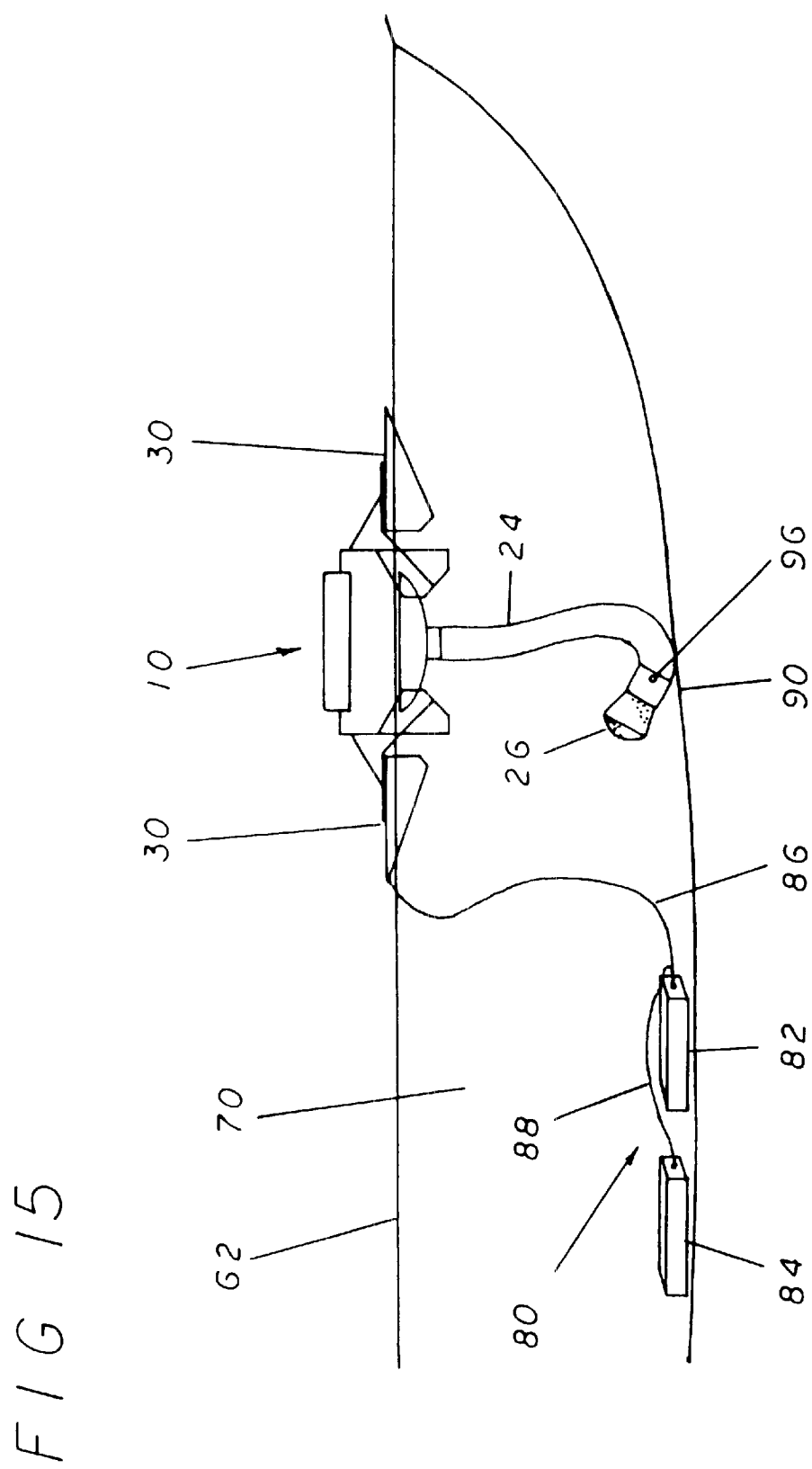
FIG. 15 is a side elevation representational view depicting the use of the present invention with a typical water circulation apparatus illustrating its orientation in normal, or non-windy, weather conditions.
Figure 16:
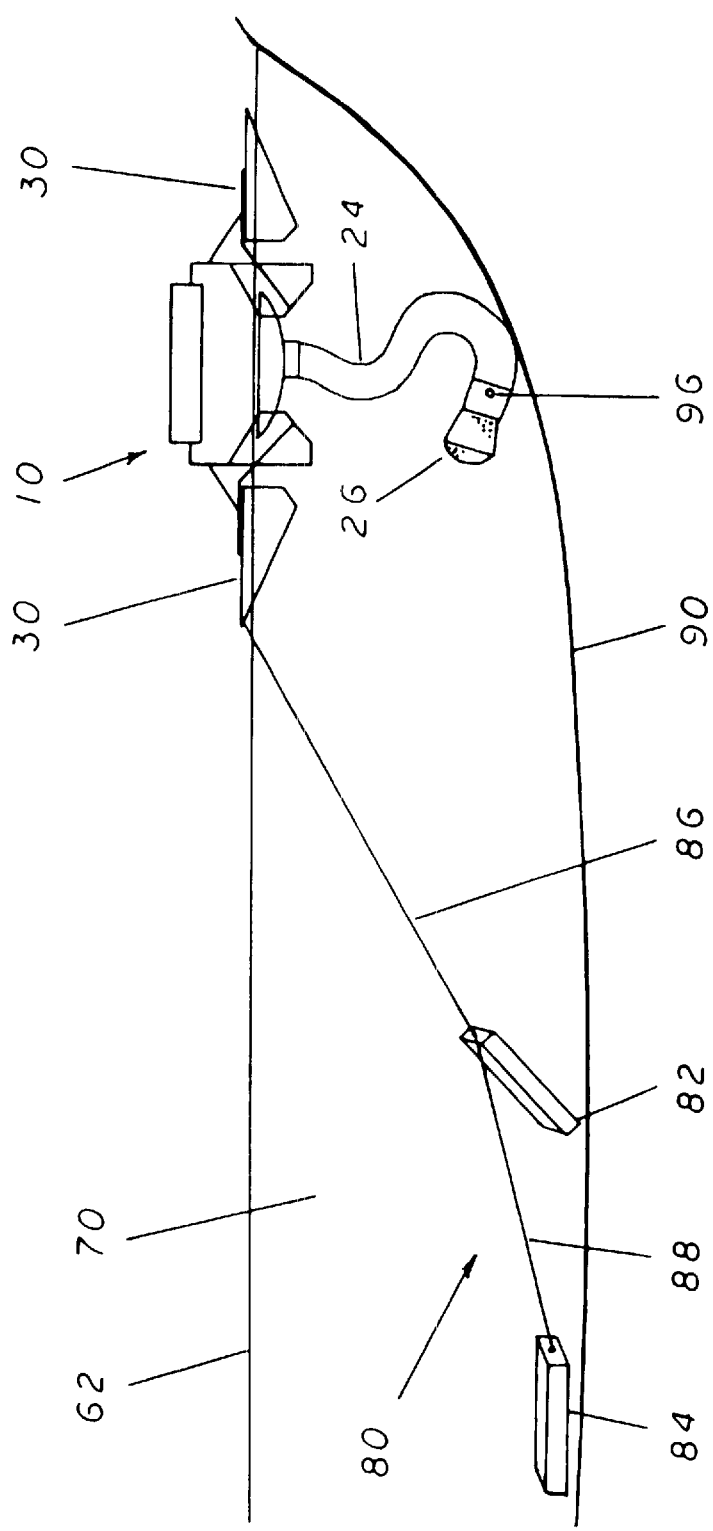
FIG. 16 is a side elevation representational view depicting the use of the present invention with a typical water circulation apparatus illustrating its orientation in abnormal, or windy, weather conditions.

The anchor for water circulation apparatus 80 is illustrated in FIGS. 15 and 16 and is made up of a pair of weighted blocks, the front anchor 82 and the rear anchor 84, that are connected in sequence by means of an anchor line 86 and the intermediate line 88 to either the frame 28 of the circulation apparatus 10 or to one of its plurality of floats 30. Each of the front an rear anchors, 82 and 84, is commonly made of concrete, or of an alternate concrete-like material, and is of the correct structural density that will allow the blocks to be used as an anchor for the water circulation apparatus 10 at a size that is practical to handle.

Additionally, the front and rear anchor blocks, 82 and 84, are formed in a manner so that they have no sharp points or edges. This is important to the function of the present invention in that a water circulation apparatus 10 is commonly used in a bodies of water 70, such as lagoons and other water treatment facilities, which have-non-permeable liners 90 between the water and the earth. The purpose of these liners 90 is to ensure that any contaminates contained in the body of water 70 are not transferred to the surrounding earth or ground water. Therefore, the relatively smooth sharp of the front and rear anchors, 82 and 84, ensures that the liner 90 will not be punctured or torn which would allow the water to enter the surrounding earth which makes a water circulation apparatus 10 that is equipped with the present invention completely safe to use in lined bodies of water 70.

The dual anchor blocks operate as an anchor for use with a water circulation apparatus 10 in normal weather conditions by simply sitting on the bottom of the body of water 70 on top of the liner 90 of a typical pond or lagoon. In these conditions, there is no undue stress place on the anchor line 86 or the front anchor block 82 and the length of the anchor line 86 between it and the water circulation apparatus 10 will control the position of the circulation apparatus 10 on the surface of the water 62. This configuration leaves the water circulation apparatus 10 to move freely about in the body of water 70 contained only by the anchor line 86 and the relative position of the front anchor 82 on the liner 90.

The problem that is addressed herein comes about when the weather conditions are less than perfect and, more specifically, when the wind is blowing hard and is creating waves on the surface of the water 62. The problem in these weather conditions is the wave motion operating on the water circulation apparatus 10 constantly places alternating tug and slack forces on the anchor 80. This can create a serious situation as these types of forces tend to draw the anchor 80 across the bottom'of the body of water 70 which can allow the water circulation apparatus 10 to wander outside of its intended confines. This is obviously an unwanted circumstance as the water circulation apparatus 10 may come into contact with the shore or other object which could result in damage to it.

The dual anchor 80 used with the present invention counteracts this potential problem and keeps the water circulation apparatus 10 within its desired range of motion on the surface of the body of water 70 which is being circulated. This occurs because as the wind speed increases and begins to move the circulation apparatus 10 away from the anchor 80, the front anchor 82 is pulled forward and upward on one of its edges by the anchor line 86. Once this has occurred, the intermediate anchor line 88 is drawn tight and any remaining tug force is then placed on the rear anchor 84. The weight of the front and rear anchors, 82 and 84, together along with the frictional resistance created by the rear anchor's 84 flat position on the liner 90 provide more than enough anchoring force to keep the water circulation 10 apparatus in the desired location.

Conversely, when the tug force on the anchor line 86 is released by the passage of the wave, the front anchor 82 will fall back to its normal position on the pond liner 90. This action serves to absorb the slack created in the anchor line 86 as the water circulation apparatus 10 drops down the back side of the passing wave and moves back toward the position of the anchor 80. Thus, the rocking action of the front anchor 82 works in conjunction with the frictional forces contained in the rear anchor 84 to hold a water circulation apparatus 10 in the desired location within any desired lagoon, pond, or other body of water 70.

The manner of construction and the means of operation of the draft hose 24 and its related components are further illustrated in FIGS. 15, 16, 17, and 18. As previously stated, the draft hose 24 is the component of the invention through which water is drawn and channeled into the diffusor 20. The draft hose 24 is connected to the diffusor 20 by means of the draft tube 22 which extends downward from the outside center of the diffusor 22. The draft hose 24 extends down from the bottom terminus of the draft tube 22 to a specific orientation in relation to the bottom of the body of water 70 or the upper surface of the non-permeable pond liner 90.

The draft hose 24 has attached to its lowest most end the strainer 26 which is the component of the draft hose 24 that sits just above the liner 90 and through which the pond water is initially drawn for circulation at the surface. The strainer is made up of the strainer head 94 and the strainer collar 92. The strainer head 94 is a generally a closed off cylinder that is made of a mesh or similar material that will allow for the free flow of water through it but will keep larger items such as weeds from entering the draft hose. This filtering function of the strainer head 94 ensures that the workings of the invention will not be interfered with. Finally, the strainer collar 92 connects the strainer head 94 to the draft hose 24 and also serves as the point of attachment for the hose weight 96. The hose weight 96 serves to keep the lower portion of the draft hose 24, and therefore the strainer head, in the proper location in relation to the bottom of the pond.

The manner of construction of the draft hose 24 and its related components is important to the operation of the present invention in that their design ensures that the draft hose 24 will always hang straight down and directly below the diffusor 20. This is accomplished through the use of the hose weight 96 which is a solid section of a relatively large diameter shaft that is mounted in the strainer collar 92. This location of the hose weight 96 serves to hold the lower portion of the draft hose 24 on the bottom of the pond thus, acting much like a draft hose anchor. Additionally, the interior of the strainer head 94 (or that portion of the draft hose that is respectively below the hose weight 96) contains a hollow strainer head float 98. The head float 98 adds a degree of buoyancy to the strainer head 94 which operates to raise the head 94 above the point where the hose weight 96 holds the draft hose 24 to the liner 90. This is an important feature to the operation of the invention as the raised strainer head 94 ensures that water will be taken in from as close to the bottom of the pond as possible without encountering the problems of sucking in unwanted plant or waste material off the bottom.

The manner of construction of the draft hose 24 is also important because of the way it functions with regard to the anchoring system employed with the present invention. In windy conditions the water circulation apparatus 10 is pushed to the end of the anchor line 86 and generally held there. As the draft hose 24 normally hangs straight down below the diffusor 20 of the invention and is held in that position by the hose weight 96, the draft hose 24 and anchoring line 86 never come into contact and there are therefore no resulting entanglement problems between the anchor line 86 and draft hose 24. However, the rotational forces imparted to the body of the invention by the operation of the impeller 18 may lead to contact between the anchor line 86 and the draft hose 24 which in turn can result in anchor line 86 entanglement. This situation occurs during calm days and is a result of the circulation apparatuses 10 relative position to the anchor 80 and anchor line 86. On a calm day the water circulation apparatus 10 is not held at the end of the anchor line 86 and so the line 86 is slack and the apparatus floats freely. This free floating mode allows the rotating impeller 18 of the invention to impart some of this rotational force to the body of the water circulation apparatus 10. This causes the entire apparatus to spin slightly on the surface of the water which in turn can cause the anchor line 86 to wrap around the draft hose 24. This, however, is not detrimental to the operation of the invention as it does not interfere with the flow of water through the draft hose 24. Additionally, when the wind comes up enough to push the circulation apparatus 10 to the end of the anchor line 86, the wrapped line 86 will freely uncoil and the invention will return to normal operation.

Although the present invention has been described in considerable detail with reference to certain preferred versions thereof, other versions are possible. Therefore, the spirit and scope of the appended claims should not be limited to the description of the preferred versions contained herein.

What is claimed is:

1. A distribution dish for a liquid circulation apparatus for circulating liquid from lower levels to the upper surface for mixing and exposure to the atmosphere, said circulation apparatus having a drive system to move the liquid through said distribution dish so as to evenly distribute the liquid, said distribution dish comprising:

a circular dish placed just below the upper surface of said liquid said dish having outer walls with an upper edge and a lower edge, said outer walls tapering down and inward from said upper edge to said lower edge so as to define an upper opening and a lower opening, said lower opening having an area substantially less that of said upper opening, said dish being concave upwardly facing;

a draft tube connected to said lower opening said draft tube walls extending perpendicularly downward from said lower opening;

a impeller connected to 'said drive system, said impeller positioned in said dish above said draft tube said impeller having a diameter greater than that of said draft tube or said lower opening; and an upper horizontal lip defined by said circular dishes upper edge, said upper lip being substantially parallel to said upper surface of said water.

2. A distribution dish as in claim 1 further comprising a draft tube intake end and a strainer head attached to said draft tube intake end.

3. A distribution dish as in claim 2 wherein said strainer head further comprises a weight near said draft tube intake end.

4. A distribution dish as in claim 3 wherein said strainer head further comprises a float section inside of said strainer head.

5. A distribution dish as in claim 4 further comprising a vertical plate fixedly attached inside of said draft tube, said vertical plate being substantially perpendicular to said upper surface of said liquid.

6. A distribution dish as in claim 5 wherein said vertical plate divides said draft tube into at least two sections.

7. A distribution dish as in claim 6 wherein said circular dish further defines at least one freeze flow slot.

8. A distribution dish as in claim 7 further comprising an anchoring system said anchoring system having a first anchor block having a first connection point, a second anchor block having a second connection point, a first flexible elongate attachment between said first connection point and said second connection point; and a second elongate attachment between said second anchor block and said floating pond mixing device.

9. A distribution dish as in claim 8 wherein said first and said second anchor block have substantially smooth edges.

10. A liquid circulation apparatus for moving liquid from the lower levels of a body of liquid to the upper surface said liquid circulation apparatus comprising:

a circular dish placed just below the upper surface of said liquid said dish having outer walls with an upper edge and a lower edge, said outer walls tapering down and inward from said upper edge to said lower edge so as to define an upper opening and a lower opening said lower opening having an area substantially less that of said upper opening;

said circular dish defining at least one freeze flow slot;

an upper horizontal lip defined by said circular dish's upper edge, said upper lip being substantially parallel to said upper surface of said water;

an impeller mounted in a horizontal position above said lower opening of said circular dish, said impeller having a diameter at least as great as the diameter of said lower opening; and a frame section mounted about said circular dish.

11. A liquid circulation apparatus as in claim 10 further comprising a plurality of float section attached to said frame section, said float sections adjusted so as to hold said circular dish in a position just below the surface of said body of water.

12. A liquid circulation apparatus as in claim 11 further comprising an electric drive means for rotating said impeller.

13. A liquid circulation apparatus as in claim 12 further comprising a plurality of solar panels for powering said electric drive means said solar panels being fixedly attached to said frame section.

14. A liquid circulation apparatus as in claim 13 wherein said electric drive means and said impeller are removably attached to said frame section as a single unit.

15. A liquid circulation apparatus as in claim 14 further comprising a draft hose having a first and second end, said first end being attached to said draft tube and said second end having a strainer head.

16. A liquid circulation apparatus as in claim 15 wherein said strainer head further comprises a weight section and a float section.

17. A liquid circulation apparatus as in claim 16 further comprising an anchoring system said anchoring system having a first anchor block having a first connection point, a second anchor block having a second connection point, a first flexible elongate attachment between said first connection point and said second connection point; and a second elongate attachment between said second anchor block and said floating pond mixing device.

18. A method of creating a circulating flow in a body of liquid having an upper surface and lower levels said method comprising the steps of:

A. Placing a liquid circulation apparatus in said body of water said liquid circulation apparatus having a circular dish placed just below the upper surface of said liquid said dish having outer walls with an upper edge and a lower edge, said outer walls tapering down and inward from said upper edge to said lower edge so as to define an upper opening and a lower opening, said lower opening having an area substantially less that of said upper opening, said dish being concave upwardly facing;

B. Drawing liquid from lower levels of said body of liquid to a point near the surface inside of said circular dish on said liquid circulation apparatus through a draft tube connected to said lower opening said draft tube walls extending perpendicularly downward from said lower opening said draft tube further having an impeller said impeller positioned in said dish above said draft tube said impeller having a diameter greater than that of said draft tube or said lower opening;

C. Supplying said circular dish with an outer horizontal lip;

D. Distributing said water from said lower levels in a 360 degree manner over said horizontal lip;

E. Creating an outwardly expanding laminar flow of water from said distribution; and F. Repeating steps B to E so as to start the water turning in a circular fashion spreading out in all horizontal directions from said liquid circulation apparatus in a given body of liquid.

19. A method of creating a circulating flow in a body of liquid as in claim 18 further comprising the step of:

A1. Providing said circulation apparatus with a drive system for said impeller.

20. A method of creating a circulating flow in a body of liquid as in claim 19 further comprising the step of:

A2. Powering said drive system through a plurality of solar panels.

21. A method of creating a circulating flow in a body of liquid as in claim 20 further comprising the step of:

A3. Anchoring said circulation apparatus in a central location in said body of liquid.

\* \* \* \* \*